(12) United States Patent
Shorman et al.

(10) Patent No.: US 10,467,282 B2
(45) Date of Patent: Nov. 5, 2019

(54) SUGGESTING TAGS ON ONLINE SOCIAL NETWORKS

(71) Applicant: Facebook, Inc., Menlo Park, CA (US)

(72) Inventors: Aigerim Shorman, San Francisco, CA (US); Jiawen Connie Yang, Menlo Park, CA (US); Eric Andrew Shrewsberry, Palo Alto, CA (US); Wei Zhong Yeh, East Palo Alto, CA (US); Jason Fotinatos, Cupertino, CA (US); Dustin S. Ho, Palo Alto, CA (US); Jack Murray, Menlo Park, CA (US); Jeffrey Lin, Palo Alto, CA (US); Alisha S. Outridge, San Francisco, CA (US)

(73) Assignee: Facebook, Inc., Menlo Park, CA (US)

(*) Notice: Subject to any disclaimer, the term of this patent is extended or adjusted under 35 U.S.C. 154(b) by 390 days.

(21) Appl. No.: 14/973,673

(22) Filed: Dec. 17, 2015

(65) Prior Publication Data
US 2017/0177589 A1 Jun. 22, 2017

(51) Int. Cl.
| | |
|---|---|
| *G06F 16/48* | (2019.01) |
| *G06Q 50/00* | (2012.01) |
| *H04L 29/06* | (2006.01) |
| *H04L 29/08* | (2006.01) |
| *H04L 12/58* | (2006.01) |

(52) U.S. Cl.
CPC ............ *G06F 16/48* (2019.01); *G06Q 50/01* (2013.01); *H04L 51/14* (2013.01); *H04L 51/32* (2013.01); *H04L 63/101* (2013.01); *H04L 67/306* (2013.01)

(58) Field of Classification Search
CPC .. G06Q 50/01; G06Q 30/02; G06F 17/30038; G06F 16/48; H04L 51/32; H04W 4/21
See application file for complete search history.

(56) References Cited

U.S. PATENT DOCUMENTS

| | | | |
|---|---|---|---|
| 2004/0073918 A1* | 4/2004 | Ferman | H04H 60/46 725/34 |
| 2008/0097867 A1* | 4/2008 | Engle | G06Q 30/02 705/26.7 |
| 2010/0114881 A1* | 5/2010 | Christian | G06F 16/954 707/723 |

(Continued)

OTHER PUBLICATIONS

Ferrara, Felice, and Carlo Tasso. "A Keyphrase Extraction Approach for Social Tagging Systems." In KDIR, pp. 362-365. 2012. (Year: 2012).*

*Primary Examiner* — Jesse P Frumkin
(74) *Attorney, Agent, or Firm* — Baker Botts L.L.P.

(57) ABSTRACT

In one embodiment, a method includes accessing one or more content objects associated with a first user of an online social network; generating a set of tag candidates by extracting one or more n-grams from the content objects, wherein each tag candidate comprises one or more text strings or ideograms from the extracted n-grams; calculating, for each tag candidate of the set of tag candidates, a quality-score for the tag candidate based on an affinity coefficient between the first user and a respective content object from which the n-grams or ideograms comprising the tag candidate were extracted; and sending, to a client system for display, one or more of the tag candidates as suggested tags for the first user, wherein each suggested tag has a quality-score greater than a threshold quality-score.

24 Claims, 6 Drawing Sheets

(56) References Cited

U.S. PATENT DOCUMENTS

| | | | |
|---|---|---|---|
| 2011/0225048 A1* | 9/2011 | Nair | G06Q 30/02 |
| | | | 705/14.66 |
| 2012/0016885 A1* | 1/2012 | Jin | G06F 17/30884 |
| | | | 707/748 |
| 2012/0144316 A1* | 6/2012 | Deng | G06Q 30/02 |
| | | | 715/751 |
| 2012/0185486 A1* | 7/2012 | Voigt | H04L 51/32 |
| | | | 707/741 |
| 2012/0219191 A1* | 8/2012 | Benzarti | G06Q 30/0201 |
| | | | 382/106 |
| 2012/0246302 A1* | 9/2012 | Lafleur | G06Q 30/02 |
| | | | 709/224 |
| 2012/0303561 A1* | 11/2012 | Sathish | G06F 17/30873 |
| | | | 706/14 |
| 2012/0331064 A1* | 12/2012 | Deeter | G06Q 10/10 |
| | | | 709/206 |
| 2013/0046761 A1* | 2/2013 | Soderberg | G06F 17/30038 |
| | | | 707/736 |
| 2013/0054503 A1* | 2/2013 | Boyd | G06Q 10/10 |
| | | | 706/46 |
| 2013/0262588 A1* | 10/2013 | Barak | H04L 67/22 |
| | | | 709/204 |
| 2014/0047386 A1* | 2/2014 | Lynch | G06F 3/0482 |
| | | | 715/810 |
| 2014/0075333 A1* | 3/2014 | Taneja | G06F 9/543 |
| | | | 715/752 |
| 2015/0149469 A1* | 5/2015 | Xu | G06F 17/30038 |
| | | | 707/740 |
| 2015/0293989 A1* | 10/2015 | Bhargava | G06F 16/9535 |
| | | | 707/737 |

* cited by examiner

SUGGESTING TAGS ON ONLINE SOCIAL NETWORKS

TECHNICAL FIELD

This disclosure generally relates to online social networks and tagging objects within a social-networking environment.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

SUMMARY OF PARTICULAR EMBODIMENTS

In particular embodiments, the social-networking system may allow users to tag profiles and other content objects (collectively "objects") associated with an online social network, and may provide suggested tags to users for tagging such objects. Users may be able to select or input descriptive object-tags to tag their own profiles, the profiles of other users, or other suitable content objects associated with the online social network (e.g., posts, videos, photos, etc.). In particular embodiments, if a first user tags the profile (or other content object) of a second user, the second user may need to approve the object-tag before it appears on the second user's profile (i.e., the object-tag will be pending until the tagged user approves the object-tag). If an object-tag is approved, the object-tag may appear on the user's profile for other users to view. In particular embodiments, tagging and object-tag viewing access may depend on the user's privacy settings, and may be limited to the user's friends, friends of friends, or to the general public.

In particular embodiments, the social-networking system may provide suggested object-tags ("suggested tags") for a user to tag the user's own profile/content, and/or for the user to tag the profile/content of another user. The suggested tags may be based on candidate object-tags ("tag candidates") extracted from content objects associated with the user (e.g., posts accessed/viewed by the user). In particular embodiments, the social-networking system may provide suggested tags to a user by: accessing one or more content objects associated with a first user of an online social network; generating a set of tag candidates by extracting one or more n-grams from the content objects, wherein each tag candidate comprises one or more text strings or ideograms from the extracted n-grams; calculating, for each tag candidate of the set of tag candidates, a quality-score for the tag candidate based on an affinity coefficient between the first user and a respective content object from which the n-grams or ideograms comprising the tag candidate were extracted; and sending, to a client system for display, one or more of the tag candidates as suggested tags for the first user, wherein each suggested tag has a quality-score greater than a threshold quality-score. After the profile/content of a user has been tagged, the object-tag may be kept pending until the user approves the object-tag. The social-networking system may send a notification to the user indicating the user's profile/content has been tagged with a particular object-tag, that the object-tag is pending, and requesting that the user confirm the pending object-tag ("pending tag"). The user may approve or reject the pending tag (e.g., via a tag dashboard). If the user approves the pending tag, the object-tag may then appear on the user's profile for other users to view.

In particular embodiments, an object-tag may comprise a word, phrase, or symbol that describes or identifies something about a user or content object associated with the online social network. An object-tag may be comprise free-form text, and may be restricted to a pre-defined character limit. An object-tag may also include emojis, stickers, photos, animated images, or other suitable inputs. As an example and not by way of limitation, a user who enjoys running marathons may be tagged as a "runner," "distance runner," "marathoner," and the like. After a user's profile has been tagged, the object-tag may appear on the user's profile, and may be viewable/searchable by others. An object-tag that has not yet been approved or rejected may appear on the user's profile in a "pending" state. A pending tag may be viewable only by the user associated with the pending tag (or possibly other users specified by the user's privacy settings).

In particular embodiments, a user may be able to search for other users or content objects by the object-tags associated with the users/objects. To search by an object-tag, a user may select a particular object-tag, and the social-networking system may identify other users/objects tagged with the particular object-tag, and send a search-results page (or other suitable interface) to the querying user for display. A user may also search for particular object-tags by inputting a search query into a query field. As an example and not by way of limitation, if a user inputs the term "surfer" in a query field, the social-networking system may search profiles/objects associated with the user's friends and return a search-results page with search results referencing one or more profiles of the user's friends that have been tagged with a "surfer" object-tag. The social-networking system may also search public profiles/objects, and may also return search results referencing a Kelly Slater fan page, and/or a page of a local surf shop close to the user's home, both of which are tagged with the "surfer" object-tag.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

System Overview

Figure 1:
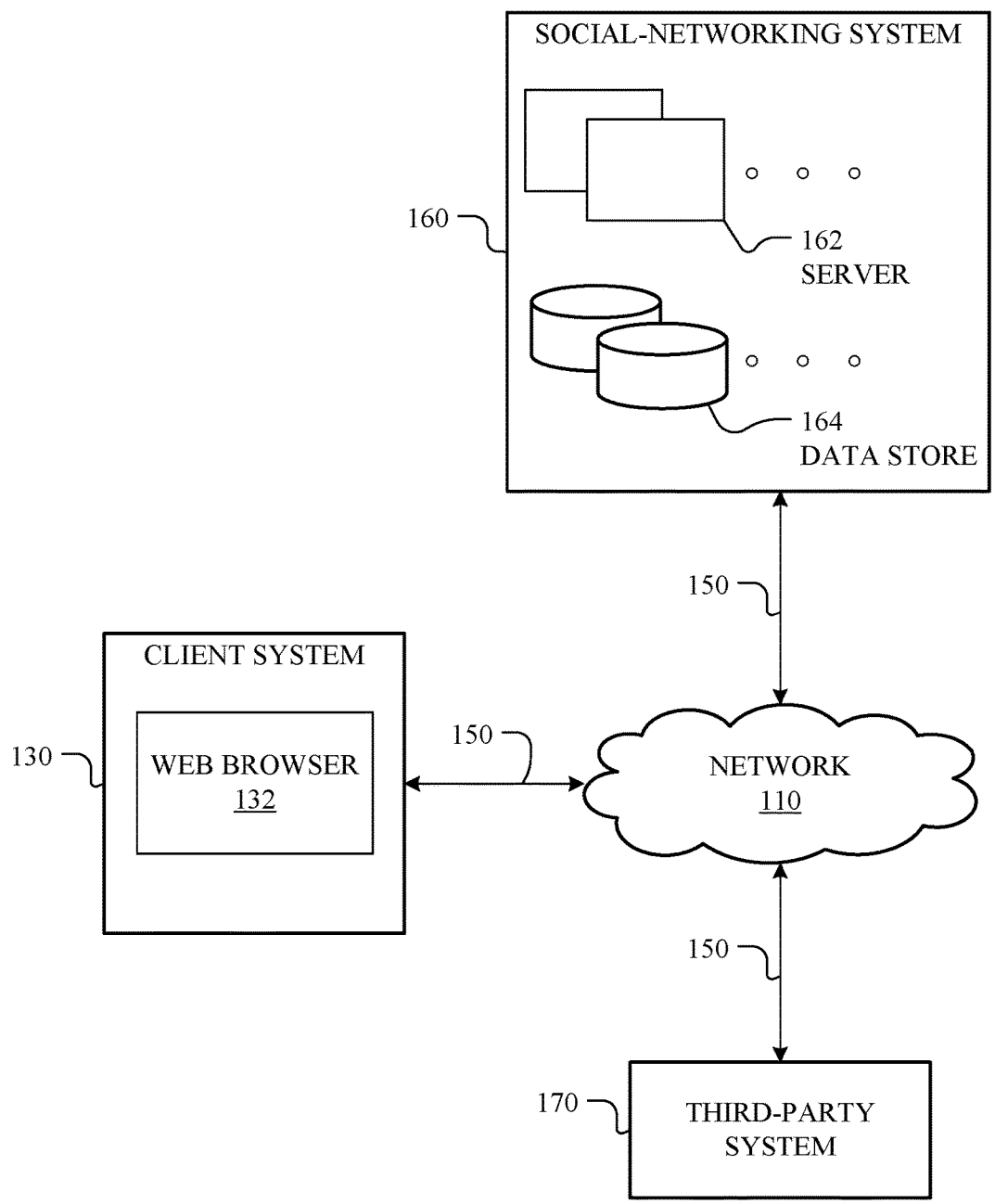
FIG. 1 illustrates an example network environment associated with a social-networking system.

FIG. 1 illustrates an example network environment 100 associated with a social-networking system 160. Network environment 100 includes a client system 130, a social-networking system 160, and a third-party system 170 connected to each other by a network 110. Although FIG. 1 illustrates a particular arrangement of a client system 130, a social-networking system 160, a third-party system 170, and a network 110, this disclosure contemplates any suitable arrangement of a client system 130, a social-networking system 160, a third-party system 170, and a network 110. As an example and not by way of limitation, two or more of a client system 130, a social-networking system 160, and a third-party system 170 may be connected to each other directly, bypassing a network 110. As another example, two or more of a client system 130, a social-networking system 160, and a third-party system 170 may be physically or logically co-located with each other in whole or in part. Moreover, although FIG. 1 illustrates a particular number of client systems 130, social-networking system 160, third-party systems 170, and networks 110, this disclosure contemplates any suitable number of client systems 130, social-networking system 160, third-party systems 170, and networks 110. As an example and not by way of limitation, network environment 100 may include multiple client systems 130, social-networking system 160, third-party systems 170, and networks 110.

This disclosure contemplates any suitable network 110. As an example and not by way of limitation, one or more portions of a network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 110 may include one or more networks 110.

Links 150 may connect a client system 130, a social-networking system 160, and a third-party system 170 to a communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout a network environment 100. One or more first links 150 may differ in one or more respects from one or more second links 150.

In particular embodiments, a client system 130 may be an electronic device including hardware, software, or embedded logic components or a combination of two or more such components and capable of carrying out the appropriate functionalities implemented or supported by a client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at a client system 130 to access a network 110. A client system 130 may enable its user to communicate with other users at other client systems 130.

In particular embodiments, a client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at a client system 130 may enter a Uniform Resource Locator (URL) or other address directing a web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to a client system 130 one or more Hyper Text Markup Language (HTML) files responsive to the HTTP request. The client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, the social-networking system 160 may be a network-addressable computing system that can host an online social network. The social-networking system 160 may generate, store, receive, and send social-networking data, such as, for example, user-profile data, concept-profile data, social-graph information, or other suitable data related to the online social network. The social-networking system 160 may be accessed by the other components of network environment 100 either directly or via a network 110. As an example and not by way of limitation, a client system 130 may access the social-networking system 160 using a web browser 132, or a native application associated with the social-networking system 160 (e.g., a mobile social-networking application, a messaging application, another suitable application, or any combination thereof) either directly or via a network 110. In particular embodiments, the social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, the social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, the social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. The social-networking system 160 may provide users of the online social network the ability to communicate and interact with other users. In particular embodiments, users may join the online social network via the social-networking system 160 and then add connections (e.g., relationships) to a number of other users of the social-networking system 160 whom they want to be connected to. Herein, the term "friend" may refer to any other user of the social-networking system 160 with whom a user has formed a connection, association, or relationship via the social-networking system 160.

In particular embodiments, the social-networking system 160 may provide users with the ability to take actions on various types of items or objects, supported by the social-networking system 160. As an example and not by way of limitation, the items and objects may include groups or social networks to which users of the social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 160 or by an external system of a third-party system 170, which is separate from the social-networking system 160 and coupled to the social-networking system 160 via a network 110.

In particular embodiments, the social-networking system 160 may be capable of linking a variety of entities. As an example and not by way of limitation, the social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating the social-networking system 160. In particular embodiments, however, the social-networking system 160 and third-party systems 170 may operate in conjunction with each other to provide social-networking services to users of the social-networking system 160 or third-party systems 170. In this sense, the social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 160 also includes user-generated content objects, which may enhance a user's interactions with the social-networking system 160. User-generated content may include anything a user can add, upload, send, or "post" to the social-networking system 160. As an example and not by way of limitation, a user communicates posts to the social-networking system 160 from a client system 130. Posts may include data such as status updates or other textual data, location information, photos, videos, links, music or other similar data or media. Content may also be added to the social-networking system 160 by a third-party through a "communication channel," such as a newsfeed or stream.

In particular embodiments, the social-networking system 160 may include a variety of servers, sub-systems, programs, modules, logs, and data stores. In particular embodiments, the social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 160 may also include suitable components such as network interfaces, security mechanisms, load balancers, failover servers, management-and-network-operations consoles, other suitable components, or any suitable combination thereof. In particular embodiments, the social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 160 to one or more client systems 130 or one or more third-party systems 170 via a network 110. The web server may include a mail server or other messaging functionality for receiving and routing messages between the social-networking system 160 and one or more client systems 130. An API-request server may allow a third-party system 170 to access information from the social-networking system 160 by calling one or more APIs. An action logger may be used to receive communications from a web server about a user's actions on or off the social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from a client system 130 responsive to a request received from a client system 130. Authorization servers may be used to enforce one or more privacy settings of the users of the social-networking system 160. A privacy setting of a user determines how particular information associated with a user can be shared. The authorization server may allow users to opt in to or opt out of having their actions logged by the social-networking system 160 or shared with other systems (e.g., a third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Social Graphs

Figure 2:
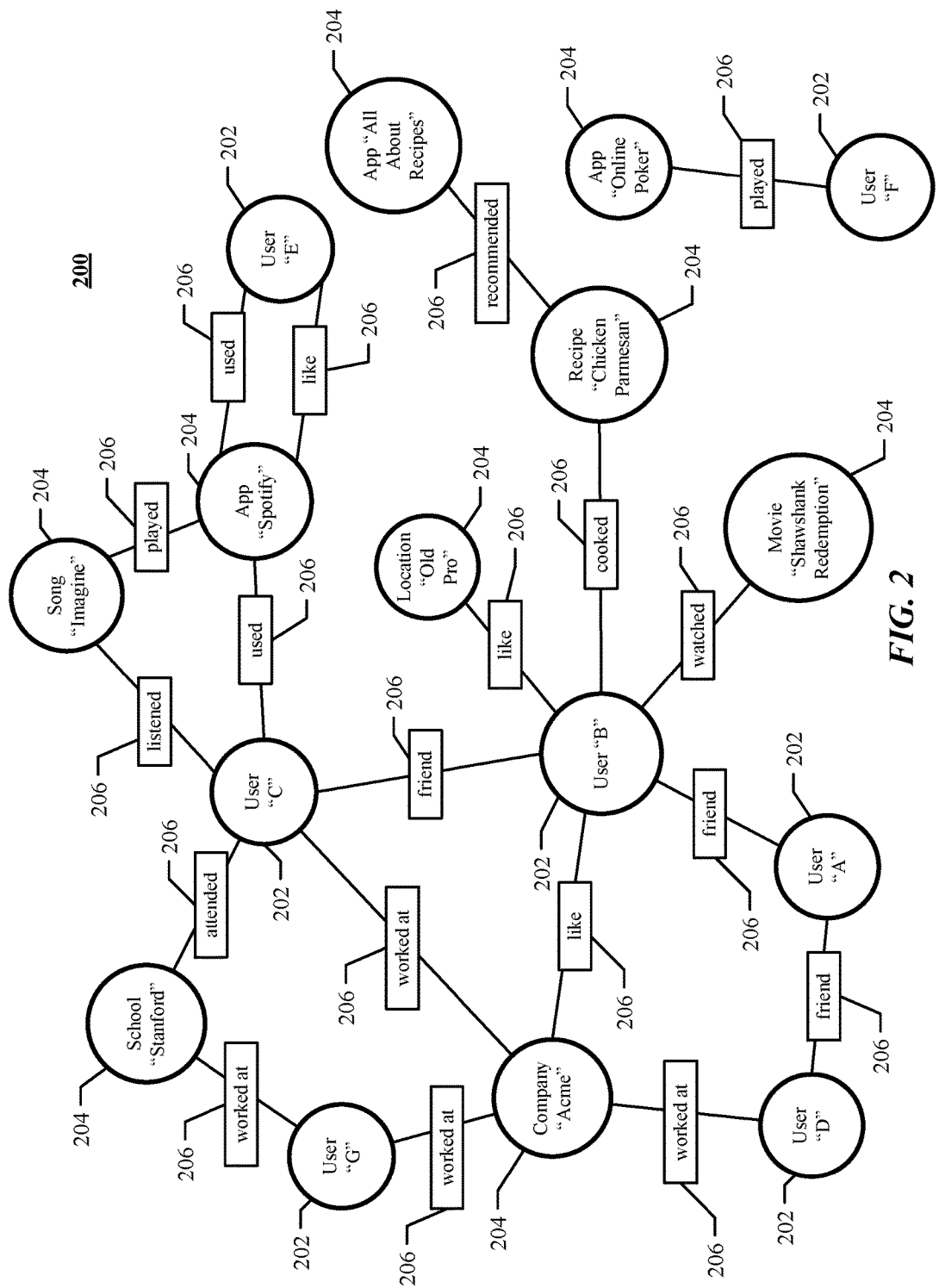
FIG. 2 illustrates an example social graph.

FIG. 2 illustrates an example social graph 200. In particular embodiments, the social-networking system 160 may store one or more social graphs 200 in one or more data stores. In particular embodiments, the social graph 200 may include multiple nodes—which may include multiple user nodes 202 or multiple concept nodes 204—and multiple edges 206 connecting the nodes. The example social graph 200 illustrated in FIG. 2 is shown, for didactic purposes, in a two-dimensional visual map representation. In particular embodiments, a social-networking system 160, a client system 130, or a third-party system 170 may access the social graph 200 and related social-graph information for suitable applications. The nodes and edges of the social graph 200 may be stored as data objects, for example, in a data store (such as a social-graph database). Such a data store may include one or more searchable or queryable indexes of nodes or edges of the social graph 200.

In particular embodiments, a user node 202 may correspond to a user of the social-networking system 160. As an example and not by way of limitation, a user may be an individual (human user), an entity (e.g., an enterprise, business, or third-party application), or a group (e.g., of individuals or entities) that interacts or communicates with or over the social-networking system 160. In particular embodiments, when a user registers for an account with the social-networking system 160, the social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with the social-networking system 160. In particular embodiments, a user node 202 may be associated with information provided by a user or information gathered by various systems, including the social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with the social-networking system 160 or a third-party website associated with a web-application server); an entity (such as, for example, a person, business, group, sports team, or celebrity); a resource (such as, for example, an audio file, video file, digital photo, text file, structured document, or application) which may be located within the social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including the social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in the social graph 200 may represent or be represented by a webpage (which may be referred to as a "profile page"). Profile pages may be hosted by or accessible to the social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to the social-networking system 160 a message indicating the user's action. In response to the message, the social-networking system 160 may create an edge (e.g., a check-in-type edge) between a user node 202 corresponding to the user and a concept node 204 corresponding to the third-party webpage or resource and store edge 206 in one or more data stores.

In particular embodiments, a pair of nodes in the social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, the social-networking system 160 may send a "friend request" to the second user. If the second user confirms the "friend request," the social-networking system 160 may create an edge 206 connecting the first user's user node 202 to the second user's user node 202 in the social graph 200 and store edge 206 as social-graph information in one or more of data stores 164. In the example of FIG. 2, the social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in the social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, the social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, the social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, the social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, the social-networking system 160 may create an edge 206 between a user node 202 and a concept node 204 in the social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to the social-networking system 160 a message indicating the user's liking of the concept associated with the concept-profile page. In response to the message, the social-networking system 160 may create an edge 206 between user node 202 associated with the user and concept node 204, as illustrated by "like" edge 206 between the user and concept node 204. In particular embodiments, the social-networking system 160 may store an edge 206 in one or more data stores. In particular embodiments, an edge 206 may be automatically formed by the social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Search Queries on Online Social Networks

In particular embodiments, a user may submit a query to the social-networking system 160 by, for example, selecting a query input or inputting text into query field. A user of an online social network may search for information relating to a specific subject matter (e.g., users, concepts, external content or resource) by providing a short phrase describing the subject matter, often referred to as a "search query," to a search engine. The query may be an unstructured text query and may comprise one or more text strings (which may include one or more n-grams). In general, a user may input any character string into a query field to search for content on the social-networking system 160 that matches the text query. The social-networking system 160 may then search a data store 164 (or, in particular, a social-graph database) to identify content matching the query. The search engine may conduct a search based on the query phrase using various search algorithms and generate search results that identify resources or content (e.g., user-profile pages, content-profile pages, or external resources) that are most likely to be related to the search query. To conduct a search, a user may input or send a search query to the search engine. In response, the search engine may identify one or more resources that are likely to be related to the search query, each of which may individually be referred to as a "search result," or collectively be referred to as the "search results" corresponding to the search query. The identified content may include, for example, social-graph elements (i.e., user nodes 202, concept nodes 204, edges 206), profile pages, external webpages, or any combination thereof. The social-networking system 160 may then generate a search-results page with search results corresponding to the identified content and send the search-results page to the user. The search results may be presented to the user, often in the form of a list of links on the search-results page, each link being associated with a different page that contains some of the identified resources or content. In particular embodiments, each link in the search results may be in the form of a Uniform Resource Locator (URL) that specifies where the corresponding page is located and the mechanism for retrieving it. The social-networking system 160 may then send the search-results page to the web browser 132 on the user's client system 130. The user may then click on the URL links or otherwise select the content from the search-results page to access the content from the social-networking system 160 or from an external system (such as, for example, a third-party system 170), as appropriate. The resources may be ranked and presented to the user according to their relative degrees of relevance to the search query. The search results may also be ranked and presented to the user according to their relative degree of relevance to the user. In other words, the search results may be personalized for the querying user based on, for example, social-graph information, user information, search or browsing history of the user, or other suitable information related to the user. In particular embodiments, ranking of the resources may be determined by a ranking algorithm implemented by the search engine. As an example and not by way of limitation, resources that are more relevant to the search query or to the user may be ranked higher than the resources that are less relevant to the search query or the user. In particular embodiments, the search engine may limit its search to resources and content on the online social network. However, in particular embodiments, the search engine may also search for resources or contents on other sources, such as a third-party system 170, the internet or World Wide Web, or other suitable sources. Although this disclosure describes querying the social-networking system 160 in a particular manner, this disclosure contemplates querying the social-networking system 160 in any suitable manner.

Typeahead Processes and Queries

In particular embodiments, one or more client-side and/or backend (server-side) processes may implement and utilize a "typeahead" feature that may automatically attempt to match social-graph elements (e.g., user nodes 202, concept nodes 204, or edges 206) to information currently being entered by a user in an input form rendered in conjunction with a requested page (such as, for example, a user-profile page, a concept-profile page, a search-results page, a user interface/view state of a native application associated with the online social network, or another suitable page of the online social network), which may be hosted by or accessible in the social-networking system 160. In particular embodiments, as a user is entering text to make a declaration, the typeahead feature may attempt to match the string of textual characters being entered in the declaration to strings of characters (e.g., names, descriptions) corresponding to users, concepts, or edges and their corresponding elements in the social graph 200. In particular embodiments, when a match is found, the typeahead feature may automatically populate the form with a reference to the social-graph element (such as, for example, the node name/type, node ID, edge name/type, edge ID, or another suitable reference or identifier) of the existing social-graph element. In particular embodiments, as the user enters characters into a form box, the typeahead process may read the string of entered textual characters. As each keystroke is made, the frontend-typeahead process may send the entered character string as a request (or call) to the backend-typeahead process executing within the social-networking system 160. In particular embodiments, the typeahead process may use one or more matching algorithms to attempt to identify matching social-graph elements. In particular embodiments, when a match or matches are found, the typeahead process may send a response to the user's client system 130 that may include, for example, the names (name strings) or descriptions of the matching social-graph elements as well as, potentially, other metadata associated with the matching social-graph elements. As an example and not by way of limitation, if a user enters the characters "pok" into a query field, the typeahead process may display a drop-down menu that displays names of matching existing profile pages and respective user nodes 202 or concept nodes 204, such as a profile page named or devoted to "poker" or "pokemon," which the user can then click on or otherwise select thereby confirming the desire to declare the matched user or concept name corresponding to the selected node.

More information on typeahead processes may be found in U.S. patent application Ser. No. 12/763,162, filed 19 Apr. 2010, and U.S. patent application Ser. No. 13/556,072, filed 23 Jul. 2012, which are incorporated by reference.

In particular embodiments, the typeahead processes described herein may be applied to search queries entered by a user. As an example and not by way of limitation, as a user enters text characters into a query field, a typeahead process may attempt to identify one or more user nodes 202, concept nodes 204, or edges 206 that match the string of characters entered into the query field as the user is entering the characters. As the typeahead process receives requests or calls including a string or n-gram from the text query, the typeahead process may perform or cause to be performed a search to identify existing social-graph elements (i.e., user nodes 202, concept nodes 204, edges 206) having respective names, types, categories, or other identifiers matching the entered text. The typeahead process may use one or more matching algorithms to attempt to identify matching nodes or edges. When a match or matches are found, the typeahead process may send a response to the user's client system 130 that may include, for example, the names (name strings) of the matching nodes as well as, potentially, other metadata associated with the matching nodes. The typeahead process may then display a drop-down menu that displays names of matching existing profile pages and respective user nodes 202 or concept nodes 204, and displays names of matching edges 206 that may connect to the matching user nodes 202 or concept nodes 204, which the user can then click on or otherwise select thereby confirming the desire to search for the matched user or concept name corresponding to the selected node, or to search for users or concepts connected to the matched users or concepts by the matching edges. Alternatively, the typeahead process may simply auto-populate the form with the name or other identifier of the top-ranked match rather than display a drop-down menu. The user may then confirm the auto-populated declaration simply by keying "enter" on a keyboard or by clicking on the auto-populated declaration. Upon user confirmation of the matching nodes and edges, the typeahead process may send a request that informs the social-networking system 160 of the user's confirmation of a query containing the matching social-graph elements. In response to the request sent, the social-networking system 160 may automatically (or alternately based on an instruction in the request) call or otherwise search a social-graph database for the matching social-graph elements, or for social-graph elements connected to the matching social-graph elements as appropriate. Although this disclosure describes applying the typeahead processes to search queries in a particular manner, this disclosure contemplates applying the typeahead processes to search queries in any suitable manner.

In connection with search queries and search results, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, and U.S. patent application Ser. No. 12/978,265, filed 23 Dec. 2010, which are incorporated by reference.

Structured Search Queries

In particular embodiments, in response to a text query received from a first user (i.e., the querying user), the social-networking system 160 may parse the text query and identify portions of the text query that correspond to particular social-graph elements. However, in some cases a query may include one or more terms that are ambiguous, where an ambiguous term is a term that may possibly correspond to multiple social-graph elements. To parse the ambiguous term, the social-networking system 160 may access a social graph 200 and then parse the text query to identify the social-graph elements that corresponded to ambiguous n-grams from the text query. The social-networking system 160 may then generate a set of structured queries, where each structured query corresponds to one of the possible matching social-graph elements. These structured queries may be based on strings generated by a grammar model, such that they are rendered in a natural-language syntax with references to the relevant social-graph elements. As an example and not by way of limitation, in response to the text query, "show me friends of my girlfriend," the social-networking system 160 may generate a structured query "Friends of Stephanie," where "Friends" and "Stephanie" in the structured query are references corresponding to particular social-graph elements. The reference to "Stephanie" would correspond to a particular user node 202 (where the social-networking system 160 has parsed the n-gram "my girlfriend" to correspond with a user node 202 for the user "Stephanie"), while the reference to "Friends" would correspond to friend-type edges 206 connecting that user node 202 to other user nodes 202 (i.e., edges 206 connecting to "Stephanie's" first-degree friends). When executing this structured query, the social-networking system 160 may identify one or more user nodes 202 connected by friend-type edges 206 to the user node 202 corresponding to "Stephanie". As another example and not by way of limitation, in response to the text query, "friends who work at facebook," the social-networking system 160 may generate a structured query "My friends who work at Facebook," where "my friends," "work at," and "Facebook" in the structured query are references corresponding to particular social-graph elements as described previously (i.e., a friend-type edge 206, a work-at-type edge 206, and concept node 204 corresponding to the company "Facebook"). By providing suggested structured queries in response to a user's text query, the social-networking system 160 may provide a powerful way for users of the online social network to search for elements represented in the social graph 200 based on their social-graph attributes and their relation to various social-graph elements. Structured queries may allow a querying user to search for content that is connected to particular users or concepts in the social graph 200 by particular edge-types. The structured queries may be sent to the first user and displayed in a drop-down menu (via, for example, a client-side typeahead process), where the first user can then select an appropriate query to search for the desired content. Some of the advantages of using the structured queries described herein include finding users of the online social network based upon limited information, bringing together virtual indexes of content from the online social network based on the relation of that content to various social-graph elements, or finding content related to you and/or your friends. Although this disclosure describes generating particular structured queries in a particular manner, this disclosure contemplates generating any suitable structured queries in any suitable manner.

More information on element detection and parsing queries may be found in U.S. patent application Ser. No. 13/556,072, filed 23 Jul. 2012, U.S. patent application Ser. No. 13/731,866, filed 31 Dec. 2012, and U.S. patent application Ser. No. 13/732,101, filed 31 Dec. 2012, each of which is incorporated by reference. More information on structured search queries and grammar models may be found in U.S. patent application Ser. No. 13/556,072, filed 23 Jul. 2012, U.S. patent application Ser. No. 13/674,695, filed 12 Nov. 2012, and U.S. patent application Ser. No. 13/731,866, filed 31 Dec. 2012, each of which is incorporated by reference.

Generating Keywords and Keyword Queries

In particular embodiments, the social-networking system 160 may provide customized keyword completion suggestions to a querying user as the user is inputting a text string into a query field. Keyword completion suggestions may be provided to the user in a non-structured format. In order to generate a keyword completion suggestion, the social-networking system 160 may access multiple sources within the social-networking system 160 to generate keyword completion suggestions, score the keyword completion suggestions from the multiple sources, and then return the keyword completion suggestions to the user. As an example and not by way of limitation, if a user types the query "friends stan," then the social-networking system 160 may suggest, for example, "friends stanford," "friends stanford university," "friends stanley," "friends stanley cooper," "friends stanley kubrick," "friends stanley cup," and "friends stanlonski." In this example, the social-networking system 160 is suggesting the keywords which are modifications of the ambiguous n-gram "stan," where the suggestions may be generated from a variety of keyword generators. The social-networking system 160 may have selected the keyword completion suggestions because the user is connected in some way to the suggestions. As an example and not by way of limitation, the querying user may be connected within the social graph 200 to the concept node 204 corresponding to Stanford University, for example by like- or attended-type edges 206. The querying user may also have a friend named Stanley Cooper. Although this disclosure describes generating keyword completion suggestions in a particular manner, this disclosure contemplates generating keyword completion suggestions in any suitable manner.

More information on keyword queries may be found in U.S. patent application Ser. No. 14/244,748, filed 3 Apr. 2014, U.S. patent application Ser. No. 14/470,607, filed 27 Aug. 2014, U.S. patent application Ser. No. 14/561,418, filed 5 Dec. 2014, and U.S. Provisional Patent Application No. 62/209,881, filed 25 Aug. 2015, each of which is incorporated by reference.

Suggesting Tags on Online Social Networks

In particular embodiments, the social-networking system 160 may allow users to tag profiles and other content objects (collectively "objects") associated with an online social network, and may provide suggested tags to users for tagging such objects. Users may be able to select or input descriptive object-tags to tag their own profiles, the profiles of other users, or other suitable content objects associated with the online social network (e.g., posts, videos, photos, etc.). In particular embodiments, if a first user tags the profile (or other content object) of a second user, the second user may need to approve the object-tag before the it appears on the second user's profile (i.e., the object-tag will be pending until the tagged user approves the object-tag). If an object-tag is approved, the object-tag may appear on the user's profile for other users to view. In particular embodiments, tagging and object-tag viewing access may depend on the user's privacy settings, and may be limited to the user's friends, friends of friends, or to the general public.

In particular embodiments, the social-networking system 160 may provide suggested object-tags ("suggested tags") for a user to tag the user's own profile/content, and/or for the user to tag the profile/content of another user. The suggested tags may be based on candidate object-tags ("tag candidates") extracted from content objects associated with the user (e.g., posts accessed/viewed by the user). The social-networking system 160 may access one or more content objects associated with a first user of an online social network; generate a set of tag candidates by extracting one or more n-grams from the content objects, wherein each tag candidate comprises one or more text strings or ideograms from the extracted n-grams; calculate, for each tag candidate of the set of tag candidates, a quality-score for the tag candidate based on an affinity coefficient between the first user and a respective content object from which the n-grams or ideograms comprising the tag candidate were extracted; and send, to a client system 130 for display, one or more of the tag candidates as suggested tags for the first user, wherein each suggested tag has a quality-score greater than a threshold quality-score. After the profile/content of a user has been tagged, the object-tag may be kept pending until the user approves the object-tag. The social-networking system 160 may send a notification to the user indicating the user's profile/content has been tagged with a particular object-tag, that the object-tag is pending, and requesting that the user confirm the pending object-tag ("pending tag"). The user may approve or reject the pending tag (e.g., via a tag dashboard). If the user approves the pending tag, the object-tag may then appear on the user's profile for other users to view.

In particular embodiments, an object-tag may comprise a word, phrase, or symbol that describes or identifies something about a user or content object associated with the online social network. An object-tag may comprise free-form text, and may be restricted to a pre-defined character limit. An object-tag may also include emojis, stickers, photos, animated images, or other suitable inputs. As an example and not by way of limitation, a user who enjoys running marathons may be tagged as a "runner," "distance runner," "marathoner," and the like. After a user's profile has been tagged, the object-tag may appear on the user's profile, and may be viewable/searchable by others. An object-tag that has not yet been approved or rejected may appear on the user's profile in a "pending" state. A pending tag may be viewable only by the user associated with the pending tag (or possibly other users specified by the user's privacy settings).

In particular embodiments, a user may be able to search for other users or content objects by the object-tags associated with the users/objects. To search by an object-tag, a user may select a particular object-tag, and the social-networking system 160 may identify other users/objects tagged with the particular object-tag, and send a search-results page (or other suitable interface) to the querying user for display. A user may also search for particular object-tags by inputting a search query into a query field. As an example and not by way of limitation, if a user inputs the term "surfer" in a query field, the social-networking system 160 may search profiles/objects associated with the user's friends and return a search-results page with search results referencing one or more profiles of the user's friends that have been tagged with a "surfer" object-tag. The social-networking system 160 may also search public profiles/objects, and may also return search results referencing a Kelly Slater fan page, and/or a page of a local surf shop close to the user's home, both of which are tagged with the "surfer" object-tag.

Figure 5:
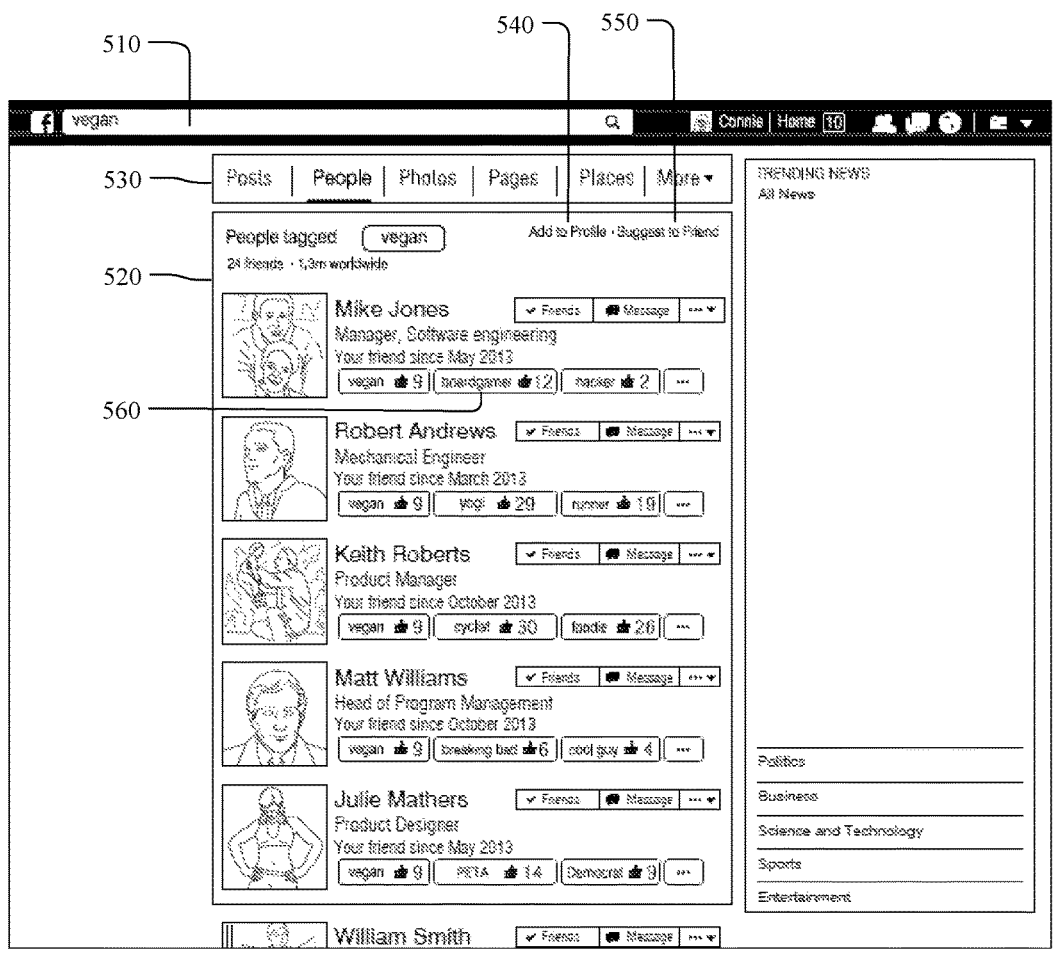
FIG. 5 illustrates an example interface representing a user search of a tag.

In particular embodiments, a first user may be able to assign one or more object-tags to herself and/or suggest one or more object-tags to one or more second users. The one or more second users may include the first user's friends, friends of friends, or any user in the general public. A user may be limited to tagging her friends' profiles and content (e.g., photos, videos, posts, etc.) that her friends have uploaded to the online social network. Access to tagging a particular user may depend on the user's privacy settings or other suitable preferences settings. It is contemplated that object-tags may appear on a user's profile page or other content object page and are visible to the public. In particular embodiments, access to view a user's object-tags may be based on that user's privacy settings. An object-tag may also be used to tag any suitable content object of the social network. Such objects may include user profiles, posts, photos, videos, events, places, pages, etc. As an example and not by way of limitation, a first user may tag the profile pages associated with the following entities: the location of a favorite running trail could be tagged "running"; a local running store could be tagged "running"; a photo of a user running could be tagged "runner"; or user could be tagged "runner." As another example and not by way of limitation, a first user Allison may suggest an object-tag to another user Bradley. Allison may navigate to Bradley's profile page on the online social network and indicate that she wishes to suggest an object-tag to appear on Bradley's profile page. In particular embodiments, such an indication may be made by selecting (i.e., by clicking, tapping, or otherwise selecting) a tag-element on a page associated with an object. Continuing with the prior example, such an icon may say, for example, "Tag Bradley." Upon selecting the tag-element, Allison may either enter an object-tag for Bradley, or may select an object-tag from a list of object-tags that may be provided by the social-networking system 160. In particular embodiments, an indication to suggest an object-tag may be made via an object-tag menu associated with an object. Continuing with the prior example, Allison may navigate to an object-tag menu that may be associated with a user (e.g., Bradley), and may either enter an object-tag description or may select an object-tag from a list of object-tags. Allison may select an option to suggest a particular object-tag to Bradley, or may select an option to suggest a particular object-tag to other entities of the social-networking system 160. Once Allison has suggested an object-tag to a user (i.e., tagged the user), that user may need to approve the object-tag in order for the object-tag to appear on that user's profile (i.e., the object-tag will be pending until approved). It is also contemplated that object-tags may appear on a user's profile without prior approval from the user. The user may have control to delete and/or alter object-tags that appear on her profile. Alternatively, Allison may enter a search query and view content objects that are tagged with object-tags that match the search query. As an example and not by way of limitation, Allison may enter "vegan" as a search query, and may view posts, people, photos, pages, places, etc. that have the "vegan" object-tag. Allison may have the option to add this tag to her own profile or to suggest the "vegan" object-tag to another user. This is illustrated in FIG. 5, which is discussed in more detail below.

In particular embodiments, the social-networking system 160 may suggest object-tags to one or more users. The social networking system 160 may deliver the object tags directly to the user for which the suggested tags were generated (the "receiving user"). The object tags may also be sent to the user's friend, or to another user of the online social network (the "recommending user") so that the recommending user may recommend the object tag to the receiving user. The suggestions may be based on a user's social actions and social graph information. As an example and not by way of limitation, if a user Alex "likes" a video of the 2015 Vans U.S. Open of Surfing, the social-networking system 160 may suggest a "surfer" object-tag to Alex. Alternatively, the social-networking system 160 may suggest to another user (e.g., Alex's friend, another user, third-party advertiser, etc.) that Alex could be tagged with the "surfer" object-tag. Similar suggestions may be made based on other actions a user takes, such as places the user visits, friends she has, content she shares, etc. After identifying possible tag candidates from these varied sources, the social-networking system 160 may score and/or rank the tag candidates based on a variety of factors, which are discussed herein.

In particular embodiments, the social-networking system 160 may suggest one or more object tags to a second user (a "recommending user") for a first user (a "receiving user"), wherein the selection of the tag candidate as a suggested tag is based at least in part on an affinity coefficient between the tag candidate and the recommending user. Any entity in the online social network may be a recommending user or a receiving user. As an example and not by way of limitation, the social networking system 160 may generate the following tag candidates for a receiving user, Alex: "fine dining," "surfing," and "football." A recommending user, Nancy, may have a high affinity for surfing (i.e., the affinity coefficient between Nancy's user node 202 and the surfing concept node 204 is relatively high). Because of Nancy's high affinity for surfing, the social-networking system 160 may suggest that Nancy tag Alex with a "surfing" tag.

In particular embodiments, the social-networking-system 160 may suggest one or more object tags to a recommending user for a receiving user, wherein the selection of the tag candidate as a suggested tag is based at least in part on content objects or concept nodes 204 associated with both the recommending user and the receiving user. As an example and not by way of limitation, the social networking system 160 may generate the following tag candidates for a receiving user, Alex: "fine dining," "Warriors fan," and "football." A recommending user, Nancy, may have been tagged or mentioned in a photo Alex posted to the online social network. The photo may depict himself and friends at a Golden State Warriors basketball game. Through any suitable means (e.g., geo-tag, check-ins, etc.), the social-networking system 160 may determine that Alex and Nancy are both associated with the photo at the Golden State Warriors game. Because of this shared interaction between Alex and Nancy, the social networking system 160 may suggest that Nancy tag Alex with a "Warriors fan" tag, as they are both associated with the same content object (i.e., Alex's photo from the Golden State Warriors' Game).

The above processes may be accomplished by the social-networking system 160 performing some or all of the following actions: accessing one or more content objects associated with a first user of an online social network; generating a set of tag candidates by extracting one or more n-grams from the content objects, wherein each tag candidate comprises one or more text strings or ideograms from the extracted n-grams; calculating, for each tag candidate of the set of tag candidates, a quality-score for the tag candidate based on an affinity coefficient between the first user and a respective content object from which the n-grams or ideograms comprising the tag candidate were extracted; and sending, to a client system 130 for display, one or more of the tag candidates as suggested tags for the first user, wherein each suggested tag has a quality-score greater than a threshold quality-score. Each of these steps is discussed below.

A "tag candidate" may comprise one or more text strings or ideograms. An ideogram may comprise one or more words, letters, numbers, or symbols (e.g., emojis, stickers, etc.). A tag candidate may be a word, phrase, symbol, or any combination thereof that describes a user or entity of the online social network or identifies something about a user or entity of the online social network. Alternatively, the tag candidate may not describe or identify something about the user. This disclosure contemplates any word, phrase, symbol, or any combination thereof as a suitable tag candidate. As an example and not by way of limitation, a tag candidate may be one of the following words/phrases: "designer," "programmer," "Californian," "West Coast," "cool guy," "classof2015" "class of 2015," an emoji of a smiling face with sunglasses, a sticker depicting a peace sign, or any other word, phrase, symbol, or combination thereof. A quality-score may be understood to mean a quantifiable measurement of how accurately a tag candidate describes the user. The quality-score may be calculated in a number of ways, as is discussed herein. The quality-score may be based on an affinity coefficient between a user and the content object from which the n-grams or ideograms comprising the tag candidate were extracted. Although this disclosure describes generating and suggesting tag candidates in a particular manner, this disclosure contemplates generating and suggesting tag candidates in any suitable manner.

In particular embodiments, the social-networking system 160 may generate a set of tag candidates by extracting one or more n-grams from one or more content objects associated with a first user of an online social network. This may be accomplished by collecting and analyzing various components of content objects. As an example and not by way of limitation, a content object may be a status update made by a user that states, "Gnarly waves at Huntington today!", which is a reference to surfing on the waves at Huntington Beach, Calif. The social-networking system 160 may generate tag candidates from the n-grams in the status update, including "Gnarly waves," "Huntington," "today," etc. The social-networking system 160 may additionally filter out so-called stop or function words (e.g., "the," "is," "at," "which," etc.) using a TF-IDF analysis, natural-language processing techniques, or other suitable techniques. The social-networking system 160 may additionally generate tag candidates that may not explicitly appear in the status update. This may be accomplished in a number of ways. In particular embodiments, the social-networking system 160 may analyze one or more status updates from a user using a term frequency-inverse document frequency analysis to determine the most important words from a corpus of user status updates. Then the social-networking system 160 may compare those words to the status updates of other users of the social-networking system 160 (including the user's friends) to determine which, if any, other users post similar status updates. The social-networking system 160 may next determine whether the other users are tagged with any object-tags, and may suggest those object-tags to the first user. As an example and not by way of limitation, if Billy updates his status to "Gnarly waves at Huntington today!", the social-networking system 160 may parse Billy's friends' posts to determine whether any of Billy's friends also talk about "Gnarly waves" and "Huntington". If the social-networking system 160 identifies Billy's friend Jake as using similar phrases as Billy's surfing posts, it may identify object-tags associated with Jake (e.g., Jake may be tagged with "surfer," "shredder," "short boarder," etc.). The social-networking system 160 may then generate the object-tags associated with Jake as tag candidates for Billy's profile. Alternatively or additionally, the social-networking system 160 may use natural language processing techniques to determine that the reference to "Huntington" in Billy's posts is a reference to Huntington Beach, Calif., which is a popular location for surfing in. The social-networking system 160 may parse "Huntington" to identify a particular concept node 204 corresponding to Huntington Beach, Calif. in the social graph 200, and thus social-networking system 160 may determine whether any posts reference the particular concept node 204. The social-networking system 160 may use this information in association with other information related to Huntington Beach to generate tag candidates common to users associated with Huntington Beach (e.g., residents of Huntington Beach, users who have checked-in or visited Huntington Beach, etc.).

In particular embodiments, the social-networking system 160 may generate tag candidates from content objects that a user accesses on the social network. As an example and not by way of limitation, a user Alex may click on several articles related to vegan cooking. The social-networking system 160 may generate tag candidates based on these articles. It may determine that the word "vegan" is a common and important word in these articles, and may generate "vegan" as a tag candidate for Alex. Alternatively or additionally, the social-networking system 160 may determine that a common object-tag among users who click on several vegan cooking articles is "vegan." Because Alex also clicked on these articles, the social-networking system 160 may identify "vegan" as a common trait among the users and Alex, and may thus generate "vegan" as a tag candidate.

In particular embodiments, the social-networking system 160 may generate the set of candidate object-tags ("tag candidates") by extracting one or more n-grams or ideograms from a set of content objects authored or accessed by the first user. Content objects associated with a user may include posts, photos/images, videos/animated images, events, places, pages, or other suitable content associated with the online social network that has been authored, viewed, accessed, liked, commented on, reshared, or otherwise associated with the user within the context of the online social network. As an example and not by way of limitation, a user Alex may post an article, status update, comment to a photo, comment to a friend's status update, etc. The post may say anything Alex chooses. For example, Alex may post a comment on a photo of himself and friends at a Golden State Warriors basketball game. The comment to the photo may state, "Steph Curry was epic last night!" The photo may be geo-tagged to show that it was taken in the Oracle Arena in Oakland, Calif., which is where the Warriors play. Alternatively, the poster of the photo may have checked-in at Oracle Arena, and then indicated he is attending or attended the Warriors game by commenting as such or by tagging the Golden State Warriors in his post. From the above information or through any suitable means, the social-networking system 160 may determine that Alex attended the Golden State Warriors game. The social-networking system 160 may generate a tag candidate called "Warriors Fan" for Alex. "Warriors Fan" may be an object-tag associated with other users who also attended the game or who posted positive posts about the Warriors or its players. In particular embodiments, third parties may sponsor particular object-tags, and the social-networking system 160 may suggest the object-tags to particular users of the online social network. For example, the Golden State Warriors may sponsor a "Official Warriors Fan" object-tag for the social-networking system 160 to send as a suggested tag to various users (e.g., members of an official Warriors fan club). The social-networking system 160 may index tag candidates comprised of n-grams and/or ideograms extracted from user posts. The social-networking system 160 may further suggest the indexed tag candidates to other users, as discussed in more detail below. Although this disclosure describes generating particular tag candidates in a particular manner, this disclosure contemplates generating any suitable tag candidates in any suitable manner.

In particular embodiments, the set of content objects associated with the first user may comprise posts associated with one or more second users of the online social network. The one or more second user may be users within a threshold degree of separation of the first user in a social graph 200. The social-networking system 160 may determine the degree of separation between a user and each content object. The degree of separation may be, for example, one (e.g., friends of the first user), two (e.g., friends-of-friends of the first user), three, or all. The social-networking system 160 may generate tag candidates using the same methods as described above. In particular embodiments, the social-networking system 160 may generate tag candidates based on how many of a user's friends, friends-of-friends, or other users post about a particular topic or entity. As an example and not by way of limitation, several people in Alex's network may post about Stanford University. The social-networking system 160 may generate a tag for Alex based on these postings. For example, it may generate as tag candidates "Stanford," "Cardinal," "Stanford Alum," or any other suitable tag. Although this disclosure describes generating tag candidates in a particular manner, this disclosure contemplates generating tag candidates in any suitable manner.

In particular embodiments, the social-networking system 160 may calculate, for each tag candidate of the set of tag candidates, a quality-score for the tag candidate. The quality-score may be on one or more factors. In particular embodiments, the quality-score may be based on an affinity coefficient between the first user and a respective content object from which the n-grams or ideograms comprising the tag candidate were extracted. A quality-score may be understood to mean a quantifiable measurement of how accurately a tag candidate describes or is related to the user. The quality-score, s, may be calculated in a number of ways. One of several ways to calculate a quality-score for a tag candidate may be to base the quality-score on an affinity coefficient. Thus, the quality-score corresponding to a particular tag candidate, s, given a particular affinity coefficient, X, and the particular tag candidate, T, may be calculated as s=(X,T). An affinity coefficient may measure the strength of a relationship or level of interest between particular objects associated with the online social network (e.g., between a user and a particular concept), as discussed in more detail below. An example of a concept may be NASA's first manned mission to Mars. A user Alex may be interested in this concept, and may read, post, like, or share several articles related to the Mars mission. As Alex interacts more with content objects related to the concept of NASA's first manned mission to Mars, the affinity coefficient associated with the edge between Alex's user node and the Mars mission concept node may increase. This may cause a tag candidate associated with the Mars mission to increase in quality-score. Note that the quality-score for such a tag candidate may only increase as in connection with Alex, and not other users of the social network. In particular embodiments, the social-networking system 160 may base the quality-score for each tag candidate on a degree of separation between the first node corresponding to the first user and the second node corresponding to the content object from which the n-grams or ideogram comprising the tag candidate were extracted. In particular embodiments, the social-networking system 160 may generate two tag candidates for a user Alex by extracting n-grams from two different content objects. As an example and not by way of limitation, the generated tags may be "entrepreneur" generated from a content object related to entrepreneurism and "crossfitter" generated from a content object related to Crossfit (which is a type of exercise regimen involving weightlifting, running, and gymnastics). There may be more degrees of separation between Alex and the concept node corresponding to the entrepreneurism content object than between Alex and the concept node corresponding to the Crossfit content object. Thus, the quality-score for the "crossfitter" tag candidate may be higher than the quality-score for the "entrepreneur" tag candidate. Although this disclosure describes calculating quality-scores for particular tag candidates in a particular manner, this disclosure contemplates calculating a quality-score for any suitable tag candidate in any suitable manner.

In particular embodiments, the quality-score for a given tag candidate may be based on one or more user interactions with suggested tags that were previously sent to the first user. A user interaction with a suggested tag previously sent to a user may include approving or rejecting the suggested tag. It is contemplated that other interactions may be available, such as indicating that the user does not want to see suggested tags in a particular field or area of interest, or postponing the decision to approve or reject the suggested tag. As an example and not by way of limitation, a user Alex may receive "democrat" as a suggested tag. This suggested tag may have resulted from the social-networking system 160 generating and sending the "democrat" object-tag based on articles Alex has read, posts he has shared and/or liked, or his friends having the "democrat" object-tag on their profiles, among other reasons. Alex may actually be an independent instead of a Democrat, or he may not wish to be labeled as having any particular political affiliation, and may thus reject the suggested tag. The social-networking system 160 may take Alex's refusal of the "democrat" suggested tag into account when determining future quality-scores for tag candidates. For example, a future generated tag candidate for Alex may be "liberal," but because Alex had previously rejected the "democrat" suggested tag, the "liberal" tag candidate may receive a lower quality-score. This determination may be made because "democrat" and "liberal" are often used together to describe people of a particular political inclination. As an example in the alternative, Alex may have approved the following suggested tags: "vegan," "vegetarian," and "clean eater." Thus, the social-networking system 160 may learn that Alex readily approves suggested tags related to nutrition and diet. If the social-networking system 160 generates a "PETA" tag candidate for Alex, this object-tag may receive a higher quality-score because "PETA" and "vegan" are often seen together and Alex has approved the "vegan" and other related suggested tags. Although this disclosure describes calculating quality-scores for particular tag candidates in a particular manner, this disclosure contemplates calculating a quality-score for any suitable tag candidate in any suitable manner.

In particular embodiments, the social-networking system 160 may send, to a client system 130 for display, one or more of the tag candidates as suggested tags for the first user. Each suggested tag send to the client system 130 may have a quality-score greater than a threshold quality-score. The threshold quality-score may be determined by the social-networking system 160, a user of the online social network, or a third-party system 170. The social-networking system 160 may determine that object-tags having a quality-score above a particular threshold may be approved at an acceptably high rate. The social-networking system 160 may wish to avoid burdening users with irrelevant suggested tags. Thus, it may only wish to send tag candidates that have a reasonably high chance of being approved by the user. Alternatively, a user may wish to set the threshold level. A user may wish to receive only those suggested tags that are highly relevant (i.e., suggested tags that she will almost certainly approve). The user may indicate this in a settings or preferences section on the online social network interface. Alternatively, a third party (e.g., advertiser) may desire to suggest object-tags that may drive business to a company. As an example and not by way of limitation, GOPRO may generate an object-tag called "GoPro Athlete" and, via a partnership with the online social network, may send this object-tag to particular users. GOPRO may wish to send it to more users and thus may set a low threshold quality-score for the object-tag, or it may wish to send the object-tag to a highly focused group of users, and may set a high threshold quality-score. Although this disclosure describes sending suggested tags in a particular manner, this disclosure contemplates sending suggested tags in any suitable manner.

In particular embodiments, the social-networking system 160 may send advertisements associated with a third-party advertiser to a user based on the tag candidates associated with the user. To send more focused advertisements to a particular user, the third-party advertiser may wish to base targeted advertisements on either: (1) the suggested tags associated with the user, or (2) suggested tags that have been approved by the user. As an example and not by way of limitation, a user Alex may approve a suggested tag for "traveler." Based on this tag, the social-networking system 160 may send advertisements associated with AIRBNB to a user Alex advertising their online apartment rental service. AIRBNB may alternatively or additionally select to send advertisements if a user has only been suggested a "traveler" or similar object-tag, or if the tag candidate was created for a particular user, but not actually suggested. This disclosure contemplates the above scenarios as well as any other suitable scenarios to send advertisements based on tag candidates, suggested tags, or approved tags.

In particular embodiments, the suggested tags for the first user may comprise one or more object-tags associated with one or more second users within the online social network. The social-networking system 160 may generate and send object-tags to a first user of the social network based on object-tags that other users of the online social network have approved for their own profiles. The other users may comprise the first user's friends, friends of friends, or other users of the online social network (e.g., users in the same network, group, geographic location, etc.). The social-networking system 160 may consider the quantity of the second users who have a particular object-tag. As an example and not by way of limitation, if a user Alex has one hundred friends on the online social network, and seventy-five of those friends have the object-tag "dog lover," the social-networking system 160 may send the "dog lover" object-tag to Alex as a suggested tag. The social-networking system 160 may determine a threshold number of a user's friends, or alternatively, a threshold proportion of friends, whereby if a quantity of a user's friends above a threshold number or proportion all have the same object-tag, the social-networking system 160 may send the object-tag as a suggested tag to the user's client system 130 for display. Although this disclosure describes sending suggested tags in a particular manner, this disclosure contemplates sending suggested tags in any suitable manner.

In particular embodiments, for one or more of the suggested tags, the social-networking system 160 may send to the client system 130 for display references to one or more content objects that are tagged with the suggested tag. The references to the one or more content objects may be sent in conjunction with the suggested tag, and may be viewable by selecting the suggested tag, or may be automatically viewable. The user may be able to view a list of other content objects (e.g., users, locations, businesses, etc.) that are tagged with the suggested tag. As an example and not by way of limitation, the social-networking system 160 may send the "vegan" object-tag to a user Alex as a suggested tag. In conjunction with sending this suggested tag, the social-networking system 160 may also send Alex a list of references to content objects that have the "vegan" object-tag that Alex may view. Thus, Alex may be able to view a list of restaurants, friends, grocery stores, and/or products that have the vegan object-tag. In particular embodiments, the social-networking system 160 may receive a selection of a reference to one of the content objects. In response to this reception, the social-networking system 160 may send to the client system 130 for display, a profile page associated with the content object corresponding to the selected reference. To continue the above example and not by way of limitation, Alex may select (e.g., by clicking, tapping, or otherwise selecting) one of the content objects on the list of content objects end in conjunction with the suggested tag. In response to the selection, Alex may be able to view the profile page of whichever content object he selected. As an example and not by way of limitation, if Sun Foods Market is on the list of references to content objects having the "vegan" object-tag, Alex may select Sun Foods Market, and may view Sun Foods Market's profile page, which may contain locations, hours of operation, store information, coupons, etc. Alex may also be able to view a list of friends, friends of friends, or strangers that have the "vegan" object-tag. He may additionally be able to view those users' profile pages according to their privacy settings. Although this disclosure describes sending references to content objects in a particular manner, this disclosure contemplates sending references to content objects in any suitable manner.

In particular embodiments, the social-networking system 160 may compile a list of blacklisted object-tags, wherein tag candidates on the list of blacklisted object-tags are not sent as suggested tags. There may be particular object-tags which may be blacklisted (i.e., banned) from becoming a tag. Such tags may be inappropriate, offensive, or otherwise unsuitable to be a tag. The social-networking system 160 may compile a list of such object-tags, and if any generated tags or suggested tags match or are closely related to object-tags on the list, the social-networking system 160 may refrain from sending those object-tags as suggested tags. Although this disclosure describes filtering blacklisted object-tags in a particular manner, this disclosure contemplates filtering blacklisted object-tags in any suitable manner.

In particular embodiments, the social-networking system 160 may index the one or more n-grams extracted from the content objects, identify n-grams having the same root element, and categorize n-grams having the same root element under the same tag candidate. This may serve to normalize n-grams so that similar n-grams are associated with the same tag candidate. As an example and not by way of limitation, the social-networking system 160 may extract the following n-grams from a user's activity on the social network (e.g., status updates, posts, comments, articles read, shared, or liked, etc.): "run," "runs," "ran," "runner," "runners," and "running." All these n-grams may share the same root element: "run." Thus, the social-networking system 160 may aggregate n-grams and categorize n-grams having the same root element under the same tag candidate. This tag candidate may be "run," "runner," or another suitable tag candidate. Although this disclosure describes normalizing n-grams in a particular manner, this disclosure contemplates normalizing n-grams in any suitable manner.

In particular embodiments, the social-networking system 160 may receive from the client system a text query. The social-networking system 160 may parse the text query to identify one or more n-grams, and search the set of tag candidates to identify one or more tag candidates that match the text query. The social-networking system 160 may also send to the client system 130 one or more of the matched tag candidates in ranked order based on the affinity coefficients between a user and the content object associated with each matched tag candidate. Additionally, the social-networking system 160 may send related tag candidates to the client system 130 for display. Tag candidates may be related if they appear together often in various content objects. The frequency with which two tag candidates must appear together to be considered related may be determined by the social-networking system 160, or by a third-party. This may provide a method whereby a user may search tag candidates to find a suitable tag. As an example and not by way of limitation, a user Alex may be interested in long distance running. He may be able to enter a search query "long distance running" to send to the social-networking system 160. The social-networking system 160 may parse the text query to identify one or more n-grams (e.g., "long," "long distance," "long distance running," "long distance runner," "distance running," "running," etc.). The social-networking system 160 may then compare these n-grams to the set of tag candidates; it may determine that the following n-grams match tag candidates in the set of tag candidates: "distance runner" and "long distance runner." The social-networking system 160 may send these two tag candidates to the client system 130 for display. The social-networking system 160 may also identify related object-tags, such as "marathoner," "ironman," "ultrarunner," etc. These tag candidates may be related because they may often appear alongside "distance runner" and "long distance runner" in content objects (e.g., articles, videos, status updates, etc.). Although this disclosure describes sending suggested tags in a particular manner, this disclosure contemplates sending suggested tags in any suitable manner.

In particular embodiments, the social-networking system 160 may suggest an alternative query if the text query results in a number of matched or related tag candidates that is below a predetermined amount. A tag candidate may match a text query if the tag candidate is identical to or has the same root as the text query. A tag candidate may be related to a text query if it appears in conjunction with the text query in content objects above a predetermined threshold amount. This may help to correct misspellings on the part of a user who may wish to tag himself with a particular object-tag or suggest an object-tag to a friend. As an example and not by way of limitation, a user Alex may have a friend Brittney who is a black belt in karate. Alex may wish to tag Brittney with a "karate master" object-tag. However, Alex may accidentally misspell "karate" as "krate." Instead of automatically sending Brittney a suggested tag of "krate master," the social-networking system 160 may first ask Alex if he actually meant to type "karate master." This spelling correction may result from the social-networking system 160 determining that "krate master" is not within the set of tag candidates, or that "krate master" returns a number of matched and related tag candidates below a predetermined amount. Further, "karate master" may be found within the set of tag candidates, and/or returns a number of matched and related tag candidates above a predetermined amount. Alternatively, this spelling correction may result from the social-networking system 160 determining that "krate master" has been generated, suggested, and/or approved far fewer times than "karate master" has. Because "karate" and "krate" are similarly spelled, the social-networking system 160 may ask Alex if he meant to type "karate master." Although this disclosure describes sending alternative queries in a particular manner, this disclosure contemplates sending alternative queries in any suitable manner.

In particular embodiments, the social-networking system 160 may calculate, for each extracted n-gram, a term-score based on a term-frequency inverse document frequency (TF-IDF) analysis of the n-gram. The social-networking system 160 may also filter out n-grams having a term-score below a predetermined value. Once the initial set of n-grams is filtered based on TF-IDF analysis, the social-networking system 160 may access an object-tag database, which may comprise user generated object-tags or object-tags generated by the social-networking system 160 or object-tags generated by one or more third parties. The social-networking system 160 may compare each of the remaining n-grams to the object-tags in the object-tag database, and select as tag candidates n-grams that match the object-tags in the database. The social-networking system 160 may also filter out each n-gram that matches an object-tag listed in a list of blacklisted object-tags. The social-networking system 160 may send the remaining object-tags as suggested tags to a client system 130 for display. Although this disclosure describes sending suggested tags in a particular manner, this disclosure contemplates sending suggested tags in any suitable manner.

In particular embodiments, the social-networking system 160 may filter the set of tag candidates by comparing each tag candidate to a set of user-generated object-tags to identify tag candidates that match the user-generated object-tags, wherein tag candidates that to not match at least one of the user-generated object-tags are filtered from the set of tag candidates. This may be a way to quickly and efficiently filter irrelevant or inapplicable tag candidates. It is contemplated that the social-networking system 160 may aggregate and index all of the object-tags users generate and/or approve for their profile. In particular embodiments, the social-networking system 160 may generate tag candidates by extracting n-grams from content objects. However, many of these n-grams may be inapplicable or irrelevant as tag candidates. It may be desirable to quickly rule out these n-grams before sending any tag candidates to the client system 130 as suggested tags. As an example and not by way of limitation, a user Alex may read several articles about fly fishing. Based on the content of these articles and/or the metadata associated with these articles, the social-networking system 160 may extract several n-grams, including, "fly fisherman," "caddis," "foam line," "line and leader," "drift," etc. The majority of these extracted n-grams may be unsuitable as object-tags for a user of the online social network. Thus, the social-networking system 160 may compare each extracted n-gram to an index of object-tags that have already been created or approved by users of the online social network. The social-networking system 160 may determine that only "fly fisherman" is found in the index of tags. Thus, the social-networking system 160 may send "fly fisherman" as a suggested tag to Alex, but may not send other n-grams (e.g., "foam line," "drift," etc.). Although this disclosure describes filtering tags in a particular manner, this disclosure contemplates filtering tags in any suitable manner.

In particular embodiments, a user may be able to navigate to a "tag dashboard" to view all his pending, approved, and rejected object-tags. The tag dashboard may comprise a list of a user's pending tags, as well as object-tags that the user has approved. In particular embodiments, a user's tag dashboard may include object-tags that the user has previously rejected. It is contemplated that a user may receive many suggested tags from either the social-networking system 160 and/or the user's friends. It may be desirable to create a centralized location (e.g., tag dashboard) associated with a user's profile page wherein the user may view all of her pending, approved, and/or rejected object-tags. In particular embodiments, the tag dashboard may be a location where a user may approve or reject pending tags, search object-tags, view object-tags associated with other users of the online social network, and/or suggest tags for other users. Although this disclosure describes implementing a tag dashboard in a particular manner, this disclosure contemplates implementing a tag dashboard in any suitable manner.

In particular embodiments, a user may be able to search for content on the social-networking system 160 by selecting a particular object-tag. As an example and not by way of limitation, a user Alex may select a user's object-tag (e.g., "rap artist"). Alternatively, Alex may enter a search query into a query field. The social-networking system 160 may return a list of search results. Alex may then view a list of content objects that are also tagged with the "rap artist" object-tag (e.g., users who rap recreationally, actual rap artists, rap songs, etc.). Alex may select one of these content objects and view any content associated with the content object (e.g., a profile page, a music video, etc.). In particular embodiments, a user may search using multiple object-tags by entering multiple tags into a search query, or selecting multiple tags from a list of existing object-tags, or by any other suitable means. As an example and not by way of limitation, Alex may enter "rap artist" and "lawyer" as search criteria, or he may select the "rap artists" object tag and the "lawyer" object tag for a search query. In response to the search query, the social-networking system 160 may return a list of the content objects (e.g., user profiles, businesses, places, events, photos, etc.) that have both the "rap artists" object-tag and the "lawyer" object-tag. Although this disclosure describes searching content by object-tag in a particular manner, this disclosure contemplates searching content by object-tag in any suitable manner.

Figure 3:
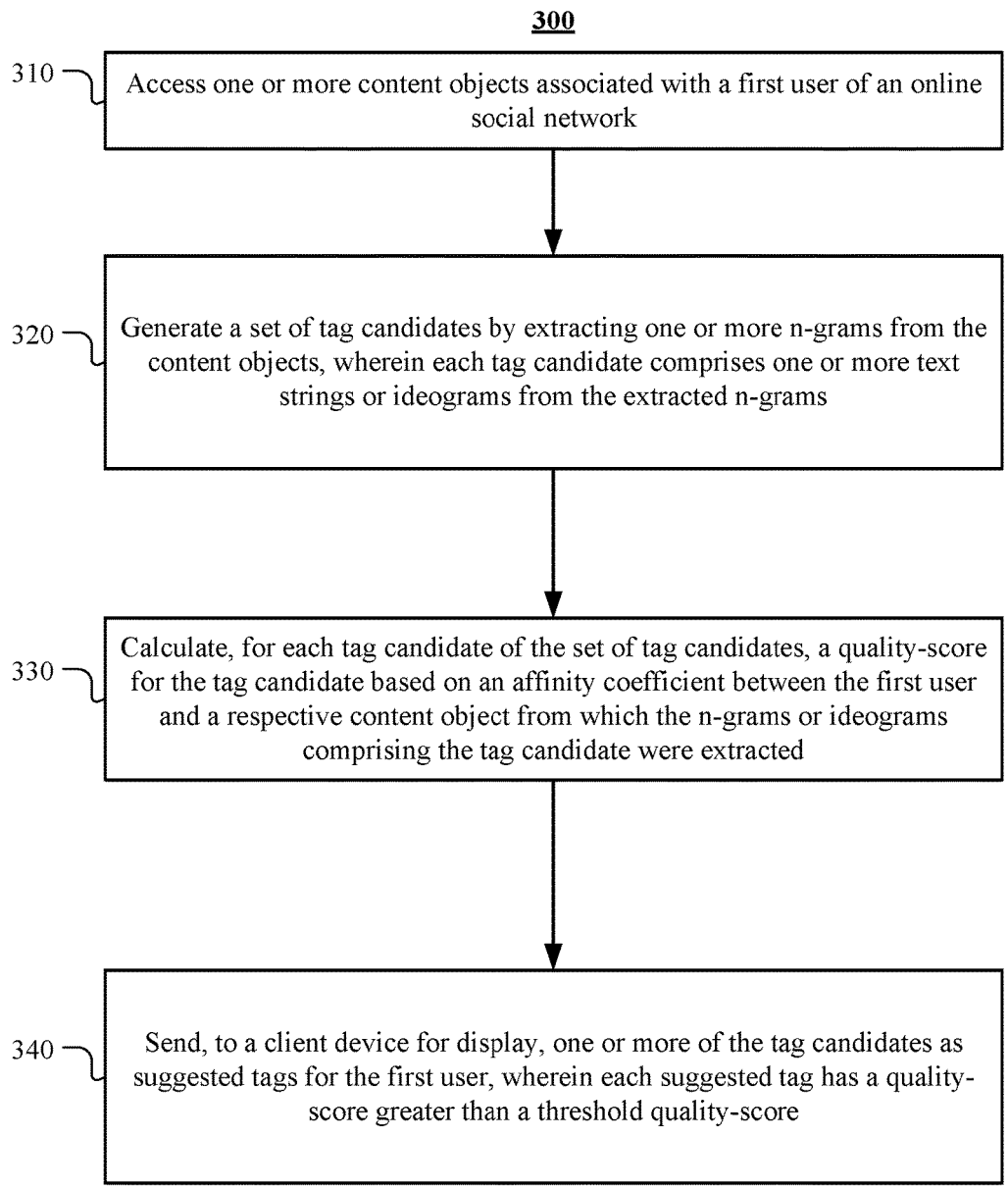
FIG. 3 illustrates an example method for generating and suggesting tag candidates to users.

FIG. 3 illustrates an example method 300 for generating and sending tag candidates to a client system 130. The method 300 may begin at step 310, where the social-networking system 160 may access content objects associated with a first user of an online social network. At step 320, the social-networking system 160 may generate a set of tag candidates by extracting one or more n-grams from the content objects. Each tag candidate may comprise one or more text strings or ideograms from the extracted n-grams. At step 330, the social-networking system 160 may calculate a quality-score for each tag candidate. The quality-score may be based one or more factors, such as the affinity coefficient between the first user and a respective content object from which the n-grams comprising the tag candidate were extracted. At step 340, the social-networking system 160 may send one or more of the tag candidates as suggested tags to a client system 130 for display. Each suggested tag may have a quality-score greater than a threshold quality-score. Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates an example method for generating and sending tag candidates to a client system including the particular steps of the method of FIG. 3, this disclosure contemplates any suitable method for generating and sending tag candidates to a client system including any suitable steps, which may include all, some, or none of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Figure 4:
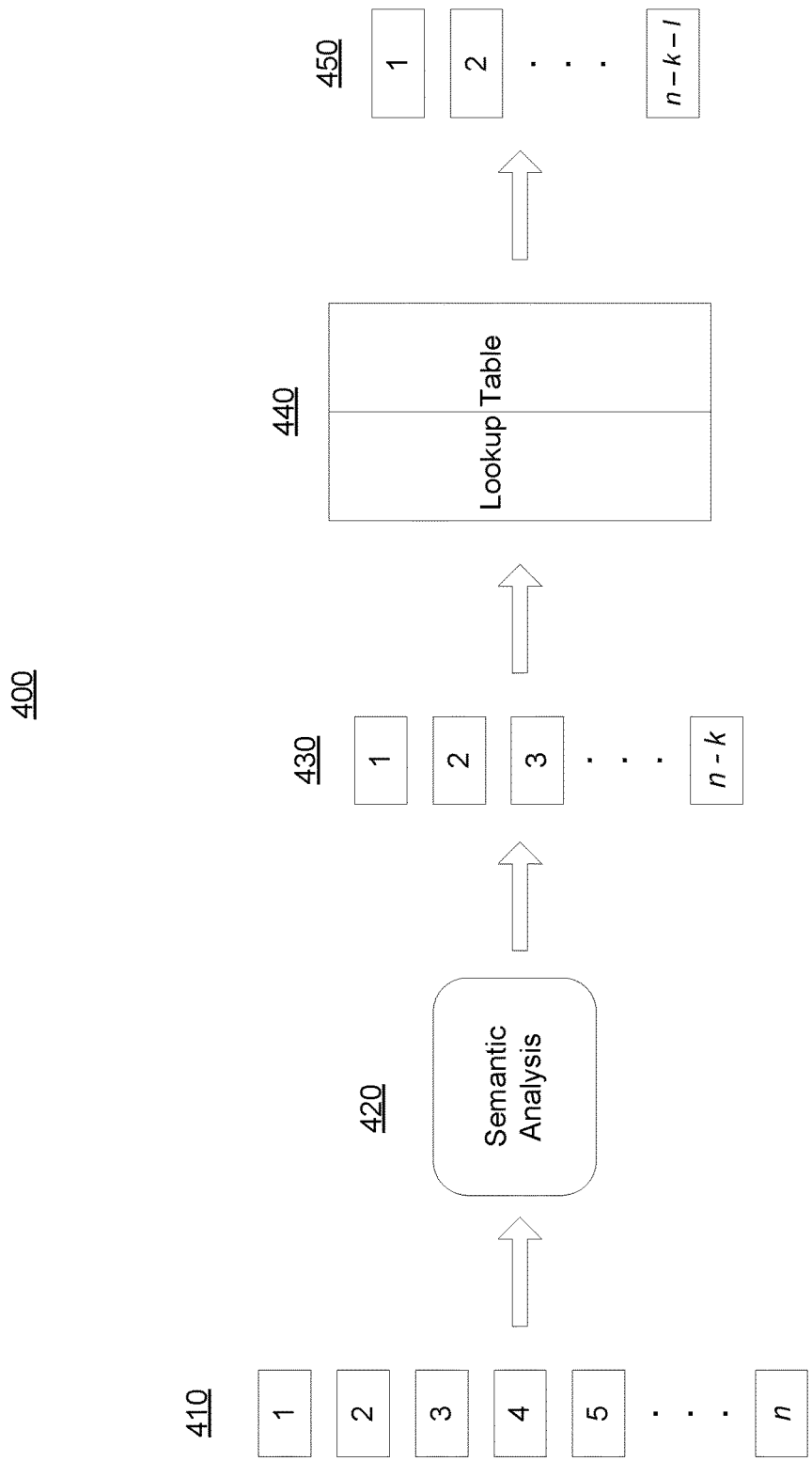
FIG. 4 illustrates an example process by which tag candidates may be filtered.

FIG. 4 illustrates an example process 400 by which tag candidates may be filtered according to an embodiment contemplated herein. At step 410, the social-networking system 160 may aggregate a set of tag candidates of number n by the methods described above. At step 420, the social-networking system 160 may apply a semantic analysis to the set of tag candidates. This semantic analysis may comprise a TF-IDF analysis, or any other suitable semantic analysis for the purpose of identifying tag candidates that may be relevant to a user. The semantic analysis may result in filtering out a number of tag candidates k. This filtering may result in the number of tag candidates being represented by n–k at step 430. Next, at step 440, the tag candidates may be compared to object-tags indexed in a lookup table, where the social-networking system 160 may compare the tag candidates to a set of object-tags that have previously been generated and/or approved by users of an online social network, by third parties, or by the social-networking system 160 itself. Object-tags that do not match those in the lookup table may be filtered out of the set of tag candidates. The tag candidates filtered out at step 440 is represented by the variable 1 in FIG. 4. The final number of object-tags at step 450 may be represented by the expression n–k–1, which may then be sent to a client system 130 for display. Object tags sent to the client system 130 may be referred to as "suggested tags." Although this disclosure describes and illustrates particular steps of the process as illustrated in FIG. 4 as occurring in a particular order, this disclosure contemplates any suitable steps of the process as illustrated in FIG. 4 occurring in any suitable order. Moreover, although this disclosure describes and illustrates an example method for generating and sending tag candidates to a client system including the particular steps of the process as illustrated in FIG. 4, this disclosure contemplates any suitable method for generating and sending tag candidates to a client system including any suitable steps, which may include all, some, or none of the steps of the process as illustrated in FIG. 4, where appropriate. Furthermore, although this disclosure describes and illustrates particular components, devices, or systems carrying out particular steps of the process as illustrated in FIG. 4, this disclosure contemplates any suitable combination of any suitable components, devices, or systems carrying out any suitable steps of the process as illustrated in FIG. 4.

FIG. 5 illustrates an example interface representing a user search of an object-tag. A user, "Connie," may enter a search for the object-tag "vegan" in query field 510. The results page 520 may display a list search results corresponding to content objects that match the query, such as posts, people, photos, pages, places, or other content objects as shown in header bar 530. Each search result references a content object associated with the "vegan" object-tag. Connie may view these search results, and may select a particular search result to retrieve a profile page or other page associated with the content object. As an example and not by way of limitation, Connie may click on the search result corresponding to "Mike Jones" and may view his profile page, in accordance with Mike's privacy settings. Connie may also elect to add the "vegan" object-tag to her own profile by selecting the "Add to Profile" button 540, thus tagging her profile with the "vegan" object-tag. Alternatively and additionally, Connie may suggest this object-tag to a friend or other user by selecting the "Suggest to Friend" button 550. If Connie selects the "Suggest to Friend" button 550, her friends list may appear and she may select friends to whom she may suggest the "vegan" object-tag. It is contemplated that a first user may suggest object-tags to one or more second users who are not necessarily the first user's friends. Other object-tags may also be viewable in the results page 520. As an example and not by way of limitation, it can be seen that Mike Jones is also tagged with the "boardgamer" tag 560. Although this disclosure describes and FIG. 5 illustrates a particular interface for searching for particular object-tags in a particular manner, this disclosure contemplates using any suitable interface to search for any suitable object-tags in any suitable manner.

Social Graph Affinity and Coefficient

In particular embodiments, the social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, the social-networking system 160 may measure or quantify social-graph affinity using an affinity coefficient (which may be referred to herein as "affinity coefficient" or simply "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, the social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, the social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, the social-networking system 160 may calculate a coefficient based on a user's actions. The social-networking system 160 may monitor such actions on the online social network, on a third-party system 170, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, the social-networking system 160 may calculate a coefficient based on the user's actions with particular types of content. The content may be associated with the online social network, a third-party system 170, or another suitable system. The content may include users, profile pages, posts, news stories, headlines, instant messages, chat room conversations, emails, advertisements, pictures, video, music, other suitable objects, or any combination thereof. The social-networking system 160 may analyze a user's actions to determine whether one or more of the actions indicate an affinity for subject matter, content, other users, and so forth. As an example and not by way of limitation, if a user may make frequently posts content related to "coffee" or variants thereof, the social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, the social-networking system 160 may calculate a coefficient based on the type of relationship between particular objects. Referencing the social graph 200, the social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, the social-networking system 160 may determine that the user has a higher coefficient with respect to the first photo than the second photo because having a tagged-in-type relationship with content may be assigned a higher weight and/or rating than having a like-type relationship with content. In particular embodiments, the social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, the social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, the social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, the social-networking system 160 may determine that the user has a higher coefficient for the airport than the gas station based on the proximity of the airport to the user.

In particular embodiments, the social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, the social-networking system 160 may provide information that is relevant to user's interests and current circumstances, increasing the likelihood that they will find such information of interest. In particular embodiments, the social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, the social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, the social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, the social-networking system 160 may calculate the coefficient (or access the coefficient information if it has previously been calculated and stored). In particular embodiments, the social-networking system 160 may measure an affinity with respect to a particular process. Different processes (both internal and external to the online social network) may request a coefficient for a particular object or set of objects. The social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

Advertising

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on the social-networking system 160). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, the social-networking system 160 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through the social-networking system 160) or RSVP (e.g., through the social-networking system 160) to an event associated with the advertisement. In addition or as an alternative, an advertisement may include social-networking-system content directed to the user. As an example and not by way of limitation, an advertisement may display information about a friend of the user within the social-networking system 160 who has taken an action associated with the subject matter of the advertisement.

Privacy

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 204 corresponding to a particular photo may have a privacy setting specifying that the photo may only be accessed by users tagged in the photo and their friends. In particular embodiments, privacy settings may allow users to opt in or opt out of having their actions logged by the social-networking system 160 or shared with other systems (e.g., a third-party system 170). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 162 may be authorization/privacy servers for enforcing privacy settings. In response to a request from a user (or other entity) for a particular object stored in a data store 164, the social-networking system 160 may send a request to the data store 164 for the object. The request may identify the user associated with the request and may only be sent to the user (or a client system 130 of the user) if the authorization server determines that the user is authorized to access the object based on the privacy settings associated with the object. If the requesting user is not authorized to access the object, the authorization server may prevent the requested object from being retrieved from the data store 164, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Systems and Methods

Figure 6:
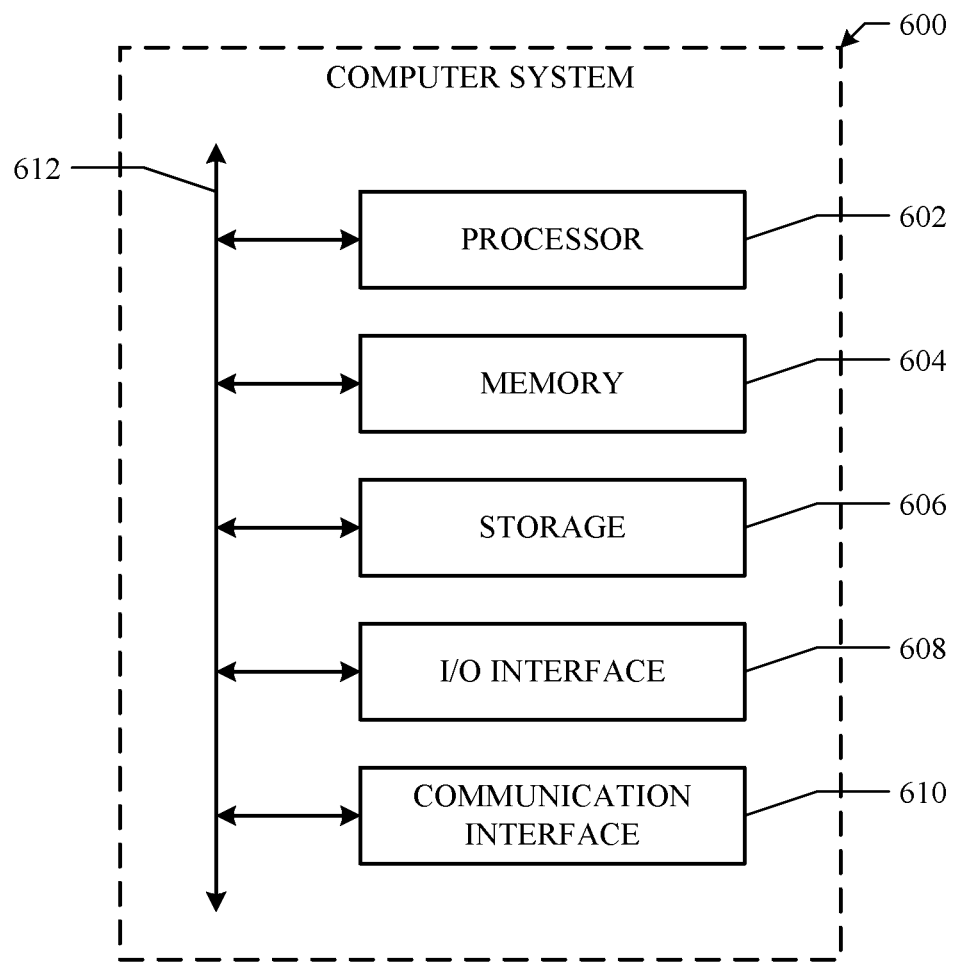
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computing systems of an online social network:

accessing, by one or more of the computing systems, one or more content objects posted to the online social network that a first user of the online social network has interacted with on the online social network, wherein each content object is associated with one or more concepts;

generating, by one or more of the computing systems, a set of tag candidates for a profile page of the first user by extracting one or more n-grams from the content objects, wherein each tag candidate comprises one or more text strings or ideograms from the extracted n-grams, wherein the profile page of the first user identifies the first user on the online social network and comprises a name of the first user and one or more of the content objects that the first user has interacted with;

calculating, by one or more of the computing systems, for each tag candidate of the set of tag candidates, a quality-score for the tag candidate based on an affinity coefficient between the first user and a respective content object from which the n-grams or ideograms comprising the tag candidate were extracted, wherein the affinity coefficient between the first user and the respective content object is based on one or more user actions taken by the first user with respect to the one or more concepts associated with the respective content object;

sending, by one or more of the computing systems, to a client system of a second user of the online social network for display, one or more of the tag candidates as suggested tags for the profile page of the first user, wherein each suggested tag has a quality-score greater than a threshold quality-score;

receiving, by one or more of the computing systems, an indication that the second user has selected one or more of the suggested tags to tag the profile page of the first user; and sending, by one or more of the computing systems to a client system of the first user, a notification to the first user that the first user's profile page has pending tags for review.

2. The method of claim 1, further comprising:

accessing a social graph comprising a plurality of nodes and a plurality of edges connecting the nodes, each of the edges between two of the nodes representing a single degree of separation between them, the nodes comprising:

a first node corresponding to a first user associated with the online social network; and a plurality of second nodes corresponding to a plurality of content objects associated with the online social network, respectively.

3. The method of claim 2, wherein the quality-score for each tag candidate is further based on a degree of separation between the first node corresponding to the first user and the second node corresponding to the content object from which the n-grams or ideogram comprising the tag candidate were extracted.

4. The method of claim 1, wherein generating the set of tag candidates comprises extracting one or more n-grams or ideograms from a set of posts authored by the first user.

5. The method of claim 1, wherein generating the set of tag candidates comprises extracting one or more n-grams or ideograms from a set of posts accessed by the first user.

6. The method of claim 5, wherein the set of posts accessed by the first user comprises posts authored by one or more second users within a threshold degree of separation of the first user in a social graph and viewed by the first user.

7. The method of claim 1, wherein the suggested tags for the first user comprise one or more object-tags associated with one or more friends of the first user within the online social network.

8. The method of claim 1, further comprising:

for one or more of the suggested tags, sending, to the client system of the second user of the online social network for display, references to one or more content objects that are tagged with the suggested tag.

9. The method of claim 8, further comprising:

receiving a selection of a reference to one of the content objects; and sending, to the client system of the second user of the online social network for display, a profile page associated with the content object corresponding to the selected reference.

10. The method of claim 1, further comprising:
indexing the one or more n-grams extracted from the content objects;
identifying n-grams having the same root element; and
categorizing n-grams having the same root element under the same tag candidate.

11. The method of claim 1, further comprising:
compiling a list of blacklisted tags, wherein tag candidates on the list of blacklisted tags are not sent as suggested tags.

12. The method of claim 1, further comprising:
receiving, from the client system, a text query;
parsing the text query to identify one or more n-grams;
searching the set of tag candidates to identify one or more tag candidates that match the text query; and
sending, to the client system, one or more of the matched tag candidates in ranked order based on the affinity coefficients between a user and the content object associated with each matched tag candidate.

13. The method of claim 12, further comprising:
suggesting an alternative query if the text query results in a number of matched tag candidates that is below a predetermined number of matches.

14. The method of claim 1, wherein generating the set of tag candidates comprises:
calculating, for each extracted n-gram, a term-score based on a term-frequency inverse document frequency (TF-IDF) analysis of the n-gram;
filtering each n-gram having a term-score below a predetermined value;
accessing a tag database of user-generated tags that have been generated by any user of the online social network;
comparing each n-gram having a term-score greater than or equal to the predetermined value to the user-generated tags in the tag database; and
selecting as tag candidates one or more of the n-grams matching the user-generated tags in the tag database.

15. The method of claim 14, wherein generating the set of tag candidates further comprises:
filtering each n-gram matching a tag listed in a list of blacklisted tags from the set of tag candidates.

16. The method of claim 1, further comprising:
filtering the set of tag candidates by comparing each tag candidate to a set of user-generated tags that have been generated by any user of the online social network to identify tag candidates that match the user-generated tags, wherein tag candidates that do not match at least one of the user-generated tags are filtered from the set of tag candidates.

17. The method of claim 1, wherein the quality-score for a given tag candidate is further based on one or more user interactions with suggested tags that were previously sent to the first user.

18. The method of claim 1, further comprising:
generating a tag dashboard, wherein the tag dashboard comprises one or more pending tags associated with the first user, wherein each pending tag is a tag candidate selected by a user of the online social network; and
receiving, from the first user, an indication of an approval or a rejection of the one or more pending tags.

19. One or more computer-readable non-transitory storage media of an online social network embodying software that is operable when executed to:
access one or more content objects posted to the online social network that a first user of the online social network has interacted with on the online social network, wherein each content object is associated with one or more concepts;
generate a set of tag candidates for a profile page of the first user by extracting one or more n-grams from the content objects, wherein each tag candidate comprises one or more text strings or ideograms from the extracted n-grams, wherein the profile page of the first user identifies the first user on the online social network and comprises a name of the first user and one or more of the content objects that the first user has interacted with;
calculate, for each tag candidate of the set of tag candidates, a quality-score for the tag candidate based on an affinity coefficient between the first user and a respective content object from which the n-gram or ideograms comprising the tag candidate were extracted, wherein the affinity coefficient between the first user and the respective content object is based on one or more user actions taken by the first user with respect to the one or more concepts associated with the respective content object;
send, to a client system of a second user of the online social network for display, one or more of the tag candidates as suggested tags for the profile page of the first user, wherein each suggested tag has a quality-score greater than a threshold quality-score;
receive an indication that the second user has selected one or more of the suggested tags to tag the profile page of the first user; and
send, to a client system of the first user, a notification to the first user that the first user's profile page has pending tags for review.

20. A system of an online social network comprising: one or more processors; and a non-transitory memory coupled to the processors comprising instructions executable by the processors, the processors operable when executing the instructions to:
access one or more content objects posted to the online social network that a first user of the online social network has interacted with on the online social network, wherein each content object is associated with one or more concepts;
generate a set of tag candidates for a profile page of the first user by extracting one or more n-grams from the content objects, wherein each tag candidate comprises one or more text strings or ideograms from the extracted n-grams, wherein the profile page of the first user identifies the first user on the online social network and comprises a name of the first user and one or more of the content objects that the first user has interacted with;
calculate, for each tag candidate of the set of tag candidates, a quality-score for the tag candidate based on an affinity coefficient between the first user and a respective content object from which the n-gram or ideograms comprising the tag candidate were extracted, wherein the affinity coefficient between the first user and the respective content object is based on one or more user actions taken by the first user with respect to the one or more concepts associated with the respective content object; and send, to a client system of a second user of the online social network for display, one or more of the tag candidates as suggested tags for the profile page of the first user, wherein each suggested tag has a quality-score greater than a threshold quality-score;

receive an indication that the second user has selected one or more of the suggested tags to tag the profile page of the first user; and send, to a client system of the first user, a notification to the first user that the first user's profile page has pending tags for review.

21. The method of claim 1, wherein the first user is a business entity and the client system is associated with the business entity.

22. The method of claim 21, further comprising:
receiving, from the business entity, an indication of an approval of at least one of the suggested tags; and
displaying the approved tags on a profile page associated with the business entity.

23. The method of claim 1, wherein the first user is a business entity and the client system is associated with a second user of the online social network.

24. The method of claim 23, further comprising:
receiving, from the client system, a selection of one of the tag candidates for the business entity;
receiving, from the business entity, an indication of an approval of the selected tag candidate; and
displaying the approved tag on a profile page associated with the business entity.

* * * * *